Dec. 20, 1960 A. J. WAYSON ET AL 2,964,899
SPINNING RING AND WICK ASSEMBLY
Filed Nov. 10, 1958 2 Sheets-Sheet 1
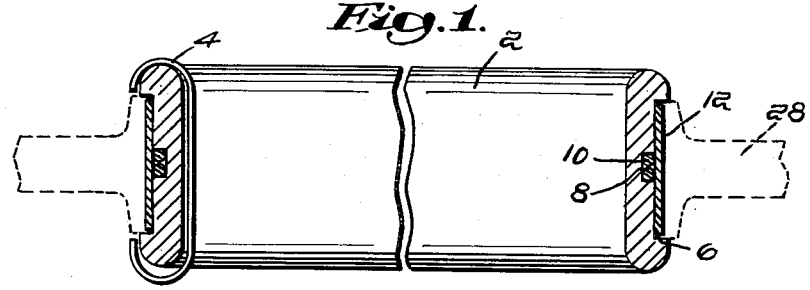
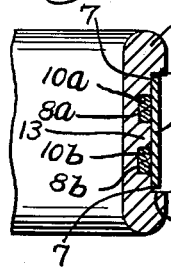 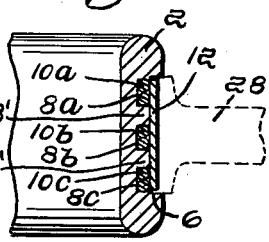 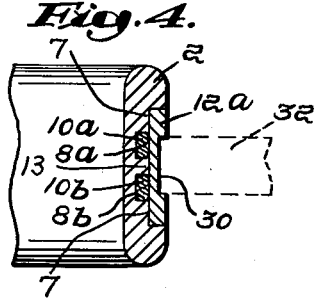
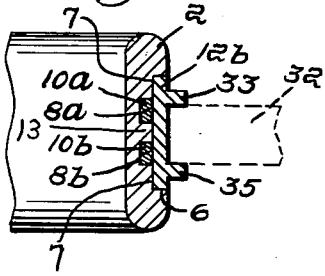 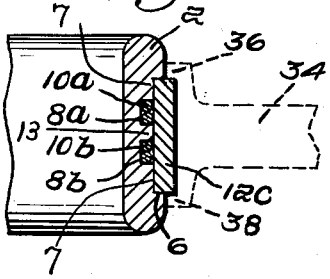
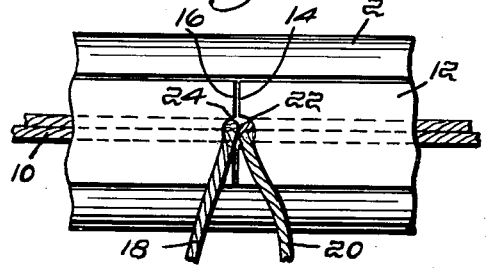 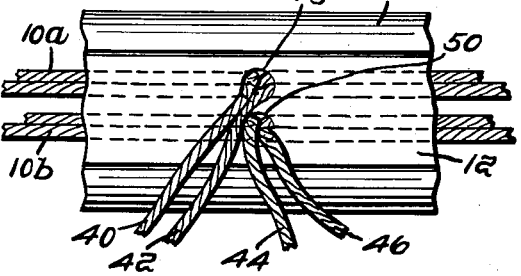
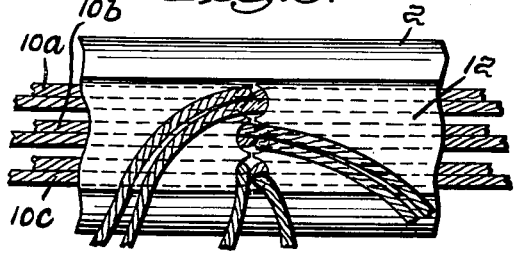
Inventors:
Andrew J. Wayson,
Angelo G. Bucchianeri,
by Porter, Chittick & Russell
Attorneys Dec. 20, 1960 A. J. WAYSON ET AL 2,964,899
SPINNING RING AND WICK ASSEMBLY
Filed Nov. 10, 1958 2 Sheets-Sheet 2
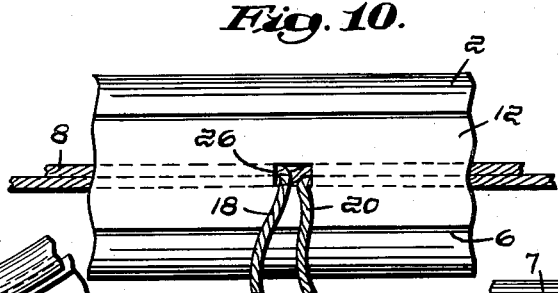
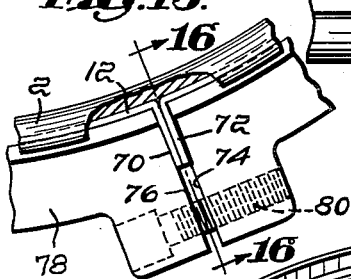
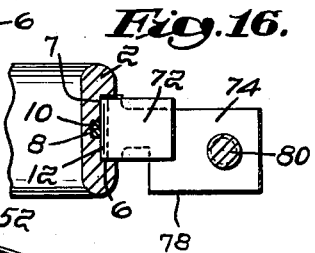
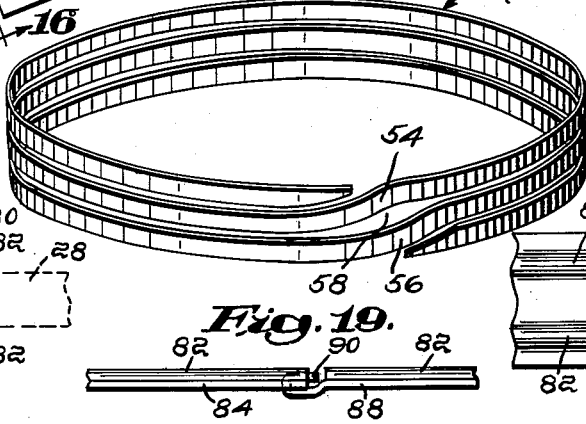
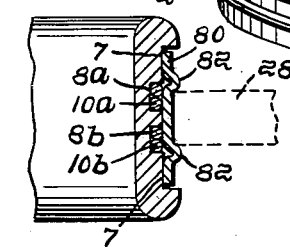
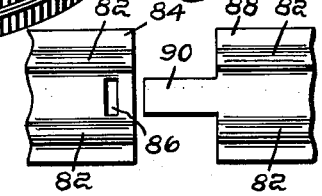
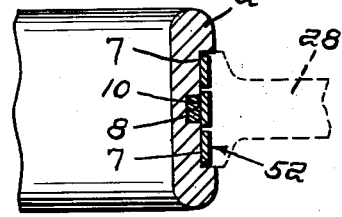
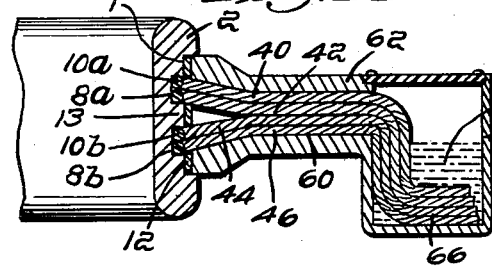
Inventors:
Andrew J. Wayson,
Angelo G. Bucchianeri,
by Porter, Chittick + Russell
Attorneys

United States Patent Office 2,964,899
Patented Dec. 20, 1960

2,964,899

SPINNING RING AND WICK ASSEMBLY

Andrew J. Wayson, Needham, and Angelo G. Bucchianeri, Millis, Mass., assignors to Merriman Bros., Inc., Boston, Mass., a corporation of Massachusetts Filed Nov. 10, 1958, Ser. No. 773,050

18 Claims. (Cl. 57—120)

This invention relates to textile machinery and is particularly concerned with spinning rings for use in spinning frames. When reference is made to spinning rings, it will be understood to include twisting rings.

The invention is particularly related to that type of ring made of porous material of such character that oil fed thereto from an external supply will be transmitted through the ring to all of the operating surfaces whereby the traveler in its high velocity movement about the ring will be properly lubricated thereby reducing wear of the traveler and correspondingly increasing the life of the ring.

Spinning rings of this character are generally made of powdered metal pressed to ring shape according to known processes, an early form of which is illustrated in the expired patent to Albrecht, 2,084,756. As the art has developed, the vertical type of ring illustrated herein has come increasingly into use. This form of ring is illustrated in the drawings, but it will be understood that the invention may be used with rings of other configuration so long as a wick holding band may be used therewith in the manner disclosed. The oil is supplied thereto by means of one or more exterior circumferential grooves in the ring in which is positioned one or more wicks, the ends of which are located in an oil reservoir. The wick may be made of any suitable material capable of transmitting oil from the reservoir to the groove. The number of oil grooves is a matter of choice. The ring is mounted by clamping it in a split holder in such manner that the oil groove or grooves of the ring are located within the confines of the clamping portions of the holder and the ring is sealed to the holder so that the only way oil can leave the oil groove is by traveling through the ring to the ring surfaces. In this way proper lubrication of the traveler is provided.

In mounting the ring in the holder, it is customary to first wrap the wick about the ring, positioning it in the one or more grooves depending upon the particular ring construction. The ends of the wick are then fed through a suitably located hole or notch in the side of the ring holder, which hole or notch leads to the oil reservoir. It is of basic importance that this operation of positioning the wick ends in the hole or notch be performed properly for if the ends of the wick are not located in the oil source lubrication will fail and the superior performance of which the porous ring is capable will be nullified. Since the rings in most instances are customarily mounted in the holders at the plant of the manufacturer, there has been no trouble under these conditions, as the requirements are fully understood. There are other situations, however, when difficulty can more readily arise, as for example when a ring is to be replaced in the holder at the spinning frame. Ring replacements are relatively infrequent and accordingly mill mechanics having less experience in this operation may improperly position the wick, not only in the grooves surrounding the ring but also in the passage to the oil source. In other instances when rings are to be shipped to foreign countries to be inserted in holders made abroad, the potential mistakes in assembly are correspondingly greater.

Accordingly, the present invention has as its main object a ring assembly which will include a ring, a groove or grooves in the ring, a wick of any suitable material in the groove or grooves for receiving a wick, and a circumferential band extending about the ring overlying the positioned wick in such manner that the wick will be maintained securely in the groove with the wick ends extending substantially together from the side of the band at one position in the circumference whereby the wick ends may readily be directed through the hole or notch of the surrounding holder to lie in the oil supply. Where the wick comprises a porous chemical oil absorbing substance which may be blown or placed into position within the band, separate wick ends may be used for carrying the oil from the reservoir to the blown or placed in wick. Such separate ends will make contact with the wick at a position inside the band, being led thereto through a suitable opening in the band.

A further object of the invention is to make the surrounding band of such configuration that it may cooperate with the holder to act as an intermediate element in securing the ring in position in the holder.

The preferred forms of the invention that will be described in detail hereinafter are not to be taken as limiting the invention in any way but are merely illustrative of some of the forms the invention may assume. It will be understood that other modifications may suggest themselves which will be within the scope of the claims appended hereto.

The circumferentially extending band that maintains the wick in position may be made of any suitable material and preferably will be non-porous so that no oil will be absorbed by the band. Preferably all of the oil in the wick or wicks will be directed to the surfaces of the groove or grooves of the porous spinning ring for transmission to the surfaces thereof. The band may be in the form of a short cylindrical sleeve so dimensioned both vertically and circumferentially as to fit properly within the shallow vertical recess on the exterior of the ring or it may be in the form of a plurality of convolutions of a generally helical character which will lie closely against each other to maintain the wicks in the grooves interiorly thereof.

In one preferred form of the invention, the band will be made of metal, ordinarily steel, split at some suitable point in its circumference so that it may be sprung over the ring and snapped into the band groove. Other materials may suggest themselves, such as a plastic band or even a band which may be applied in fluid form to thereafter harden in the proper configuration with the wick therewithin.

Another form of band may be so formed that the wick openings therethrough are intermediate the ends of the band. In still another form, the ends of the band may be turned outwardly to be positioned between the sides of the split opening in the holder. In some cases, the band will be of such thickness as to lie below the level of the exterior surfaces of the ring above and below the band. In other cases, the band may be thicker so as to be flush with the exterior surface, and in other cases the band may be still thicker so as to extend beyond the exterior surface. If desired, the band itself may have exterior configurations adapted to cooperate with the ring holder. All of these various alternatives will become more apparent as the description proceeds with the aid of the accompanying drawings in which Fig. 1 is a vertical cross-sectional view of a spinning ring showing a single wick groove with the wick held Fig. 2 is a view similar to the right side of Fig. 1 but showing a ring having two wick grooves.

Fig. 3 is a view similar to Fig. 2 but showing a ring having three wick grooves.

Fig. 4 is a view similar to Fig. 2 showing a ring with two wick grooves held in position by a thicker band designed on its exterior to receive a ring holder.

Fig. 5 is a view similar to Fig. 2 showing a ring with two oil grooves but with the band including circumferential horizontal flanges adapted to cooperate with a suitably designed ring holder.

Fig. 6 is a view similar to Fig. 2 in which the band is still thicker and extends beyond the exterior wall of the ring.

Fig. 7 is a side elevation of a portion of a spinning ring similar to that shown in Fig. 1 in which the wick openings through the band are located at the adjacent ends of the band.

Fig. 8 is a view similar to Fig. 7 showing an alternative arrangement in which the wicks extend through holes in the band located intermediate the ends thereof.

Fig. 9 is another view similar to Figs. 7 and 8 showing one arrangement whereby the ends of three wicks used in a three-groove ring extend through the band for positioning in the oil supply.

Fig. 10 is another view similar to Fig. 7 in which a single wick has its ends extending through an opening located intermediate the ends of the band.

Fig. 11 shows another type of band made in the form of a modified helix which can be spread to be passed over the ring and positioned over the groove.

Fig. 12 shows the band made according to Fig. 11 positioned on a ring.

Fig. 13 is a fragmentary vertical section taken on the line 13—13 of Fig. 12.

Fig. 14 is illustrative of the manner in which the ends of the wicks in a two-groove ring may be directed to and positioned in an oil reservoir.

Fig. 15 is a vertical plan view of a section of a ring and holder showing another type of band construction in which the ends of the band are turned outwardly to be clamped between the faces of the split in the holder.

Fig. 16 is a vertical section taken on the line 16—16 of Fig. 15.

Fig. 17 shows an alternative form of band in which the circumferential ribs are pressed in the band and act in cooperation with the ring holder.

Fig. 18 shows means for securing the band ends together.

Fig. 19 shows the connected band ends of Fig. 18 in side elevation.

Referring now to Fig. 1, there is shown a vertical type spinning ring 2 made of porous material which in the preferred form will be of powdered metal and made according to know processes. The ring has been broken away at its mid-section to economize on space in the drawings. A traveler 4 is indicated in normal position on ring 2.

A relatively wide circumferential groove 6 extends about the ring defined by an inner surface 7, this groove having a depth in the ordinary case of approximately one-third the horizontal thickness of the ring. At the middle of groove 6 is another smaller circumferential groove 8 of less vertical dimension and having a depth of approximately one-third the horizontal thickness of the ring. Groove 8 is known as an oil groove and is designed to receive a circumferentially extending wick. The wick indicated at 10 may be of any suitable material in the form of a single strand or a plurality of strands. In the form shown, two strands appear. The wick 8 is held in position by a thin circumferential band 12. The band may be of a spring-like nature which can be snapped on over the ring with its ends coming together in the proximity of each other as at 14 and 16 in Fig. 7, or it may incorporate fastening means at its ends.

The ends of the wick shown at 18 and 20 in Fig. 7 may extend outwardly from a position between the band ends 14 and 16. The band ends may have opposed semi-circular openings 22 and 24 to facilitate passage of the wick ends therethrough. An alternative wick arrangement is shown in Fig. 10, in which the ends 18 and 20 extend through a hole 26 in the band 12. In all cases, however, the wick ends must be made available to be placed in the hole or channel that leads to the oil supply.

As shown in Fig. 1, by virtue of the small thickness of band 12 in relation to the depth of groove 6 there is room for a holder 28 to be positioned within the remaining exterior portion of the groove 6 to hold ring 2 in normal operating position. Holder 28 will be made according to conventional practice, being split at one position in its circumference permitting the holder to be sprung outwardly to permit insertion of the ring. Holder 28 is then drawn together by clamping means at the split section, the clamping means usually being in the form of a screw as indicated at 80 in Fig. 15. The ring 2 is held against vertical displacement by the interlocking of holder 28 with the top and bottom shoulders of groove 6.

Fig. 2 is illustrative of the same band construction shown in Fig. 1, but in this case instead of having a single oil groove 8 there are two oil grooves 8a and 8b spaced by rib 13, in which are positioned respectively wicks 10a and 10b. By having additional oil grooves and additional wicks, more oil can be conveyed to the exterior surfaces of the porous ring in a given time. Holder 28 performs in connection with the construction of Fig. 2 the same as in that of Fig. 1. The band 12 is supported by rib 13 as well as by the inner surface 7 of the band groove 6 above and below the oil grooves.

Fig. 3 shows a construction similar to Figs. 1 and 2, but in this case the band 12 overlies three oil grooves 8a, 8b and 8c separated by two circumferential ribs 13'. In these grooves are positioned respectively three wicks, 10a, 10b and 10c. The band rests on the ribs 13' and the inner surface 7 of groove 6.

Fig. 4 departs from the preceding figures in that the band 12a differs in cross-sectional configuration from band 12. There are two oil grooves 8a and 8b and two wicks 10a and 10b the same as in Fig. 2, but the wicks are held in position by band 12a which is thicker in horizontal dimension than band 12 so that there may be therein as exterior circumferential groove 30 into which fits the interior perimeter of the ring holder 32. In this way the ring 2 is mounted without direct engagement between the ring holder and the ring, the band 12a acting as an intermediate element.

Fig. 5 shows a ring 2 having two oil grooves 8a and 8b and two wicks 10a and 10b. These wicks are held in position by a band 12b, which in the instance shown has the same thickness as the depth of groove 6 whereby the exterior surface of the band and the exterior upper and lower surfaces of the ring are substantially flush with each other. On the exterior of the band are two circumferential flanges 33 and 35 between which is positioned the interior circumferential portion of the ring holder 32.

Fig. 6 shows a further modification in which the band 12c has a horizontal dimension appreciably greater than the depth of the band groove 6 so that the exterior of band 12c extends beyond the upper and lower exterior surfaces of the ring. According to this construction, the band 12c will be adapted to cooperate with a holder 34 which will have interior circumferential upper and lower flanges 36 and 38. These flanges will cooperate with the band 12c thereby to properly support the ring in the holder 34. The holder 34 like the other holders is split at an appropriate place and includes clamping means for drawing the holder tightly about the band 12c and ring 2.

Fig. 8 shows an alternative arrangement for leading the ends of the wicks of a ring having two oil grooves to the exterior for positioning in the oil reservoir. In this construction the wicks 8a and 8b have ends 40, 42 and 44, 46 respectively, which are led through openings 48 and 50 located intermediate the ends of band 12. The wick openings could be at the ends of the band as shown in Figs. 7 and 9.

Fig. 9 shows how three wicks located in three oil grooves may be led to the oil reservoir. In this case the wicks are shown as extending outwardly at positions between the adjacent ends of the band 12 which are spaced sufficiently by means of opposed semi-circular notches. The notches are not essential but merely represent one convenient form whereby the wicks will be properly located, will have adequate room and will not be subject to undue chafing by the ends of the band.

Figs. 11, 12 and 13 show still another type of band which could be used for the present purpose. As shown in Fig. 11, the band is in the form of a modified helix 52 which may be enlarged circumferentially sufficiently to fit over the ring 2 to drop into the positions shown in Figs. 12 and 13. The band at those positions marked 54 and 56 is bent in a manner to produce an opening 58 through which the ends 18 and 20 of wick 8 may extend as shown in Fig. 12.

Fig. 14 illustrates the manner in which the several wick ends may be passed through a suitable opening 60 in a ring holder 62 to be positioned in an oil reservoir 64. The construction of ring holders having oil reservoirs therein is well known in the art and need not be further described herein. However, it can be seen that the wick ends indicated at 66 will by capillary action transmit oil 68 to the circumferential oil grooves 8a and 8b whereby oil will be fed through the porous ring to all surfaces thereof. It will be understood that at least one wick end from each wick in each of the one or more oil grooves will be positioned in the oil supply whereby oil will be transmitted to the ring about the entire circumference of each oil groove.

In Figs. 15 and 16 is shown a further modification of the band 12 in which each end of the band is turned outwardly at right angles as at 70 and 72. The spacing will be such in relation to the opposed surfaces 74 and 76 of the split ring holder 78 that upon tightening of the screw 80 the band 12 will be drawn tightly against the ring so that the ring will be properly supported for normal operation in the holder 78.

Fig. 16 is a vertical section taken on the line 16—16 of Fig. 15 showing in detail the various parts just referred to.

Fig. 17 shows another band construction 80 that functions in a manner similar to the band of Fig. 5. The circumferential ribs 82 are rolled into the band and act to locate holder 28 with respect thereto.

Figs. 18 and 19 show another way the band may be held tightly about the ring. The band end 84 has a hole 86 therethrough. The other end 88 of the band has a projection 90 which may be passed through hole 86 and folded back on itself as shown in Fig. 19. This pulls the band tightly about the ring. It will be understood that the tab 90 when in the position of Fig. 19 will be suitably compressed so as to present a smooth surface to the inside of holder 28.

When the construction of Figs. 4, 5 and 17 is used, the band, being non-porous, acts as a barrier between the ring and the holder so that spreading of oil from the ring to the holder is minimized. This helps to prevent the collection of fud (oily waste fibers) on the underside of the holder, thus lengthening the period between necessary cleaning operations. The band in the preferred construction will be as wide as possible, the limiting factor being clearance of the ends of the traveler.

While a number of preferred forms of the invention have been illustrated and described, it is to be understood that the invention is not limited thereby but only by the appended claims.

We claim:

1. A spinning ring assembly adapted to be placed in a ring holder, said assembly comprising a ring of porous material capable of transmitting a lubricant therethrough, a circumferential groove about the periphery of said ring, a wick in said groove, and a band of material overlying said groove for holding said wick in position therein, said band so formed as to define an opening whereby wick ends leading from said wick may extend outwardly from said groove.

2. The spinning ring assembly set forth in claim 1 in which there are two or more grooves separated by a circumferential rib or ribs on which said band rests.

3. The spinning ring assembly set forth in claim 1, said ring being recessed above and below said groove and said band is positioned in the recess so formed.

4. The spinning ring assembly set forth in claim 3, the thickness of said band being such that its outer surface is below the outer surface of said ring.

5. The spinning ring assembly set forth in claim 3 in which the band has a groove in its outer surface adapted to receive a ring holder.

6. The spinning ring assembly set forth in claim 3 in which said band has a radially extending circumferential flange adapted to cooperate with a ring holder for locating said ring and band vertically with respect to said holder.

7. The spinning ring assembly set forth in claim 3 in which said band is of such thickness that it has an exterior portion whose outside surface is outside of the outer surface of said ring whereby said exterior portion of said band may cooperate with a ring holder for locating said ring and band in operating position.

8. The spinning ring assembly as set forth in claim 1 in which the said opening is located intermediate the ends of said band through which opening extend the ends of the wick positioned in said groove.

9. A spinning ring assembly comprising a ring of porous material capable of transmitting a lubricant therethrough, a circumferential groove in the body of said ring and extending about the periphery thereof, recesses on opposite sides of said groove, a wick in said groove, a band of resilient material capable of being spread sufficiently to pass over said ring, said band normally residing in said recesses and overlying said groove to hold said wick in position therein and wick ends connected to the wick and extending outwardly through said band.

10. A spinning ring assembly as set forth in claim 9, said band being made of metal and separated at one point in its circumference to provide adjacent band ends.

11. A spinning ring as set forth in claim 10, the said ends of said band being turned outwardly to extend in a radial direction and being adapted to be clamped in the split opening of a cooperating ring holder.

12. A spinning ring assembly comprising a ring of porous material capable of transmitting a lubricant therethrough, a shallow wide circumferential groove extending about the periphery of said ring, a second groove intermediate the sides of said shallow groove and extending further into the ring from the bottom of said shallow groove, a wick in said second groove, and a band of resilient material residing in said first wide shallow groove and covering said second groove whereby said wick will be maintained within the said second groove, said wick having wick ends associated therewith which extend through said band.

13. A spinning ring assembly as set forth in claim 12, said band being in helical form.

14. The spinning ring assembly set forth in claim 1, said band having a pair of spaced circumferentially extending ribs thereabout adapted to receive therebetween a ring holder.

15. A spinning ring assembly as set forth in claim 9, and means on the ends of said band for connecting the said ends together to cause said band to fit closely about said recess.

16. A spinning ring assembly as set forth in claim 12, said band having connecting means on its adjacent ends whereby said ends may be secured to each other and said band drawn closely about said ring.

17. A spinning ring assembly comprising a ring of porous material capable of transmitting a lubricant therethrough, a circumferential groove extending about the periphery of said ring, a second groove intermediate the sides of said first groove and extending further into the said ring, a wick in said second groove, a band of non-porous material extending about said ring and lying in said first groove, and means on the exterior of said band for positioning a ring holder intermediate the upper and lower edges of said band, whereby said band may act as a shield to prevent oil from said ring reaching said holder.

18. A spinning ring assembly adapted to be placed in a ring holder, said assembly comprising a ring of porous material capable of transmitting a lubricant therethrough, two or more circumferential grooves extending about the periphery of said ring, said grooves being separated by a circumferential rib or ribs, a wick in said grooves, a recess in said ring above and below said grooves, a band of material overlying said grooves for holding said wick in position therein, the upper and lower edges of said band residing in said recesses and the intermediate portion of said band resting on said rib or ribs, said band so formed as to define an opening whereby wick ends leading from said wick may extend outwardly from said groove or grooves.

References Cited in the file of this patent

UNITED STATES PATENTS 2,850,866    Wayson _____ Sept. 9, 1958

FOREIGN PATENTS 383,074    Great Britain _____ Nov. 10, 1932